(12) United States Patent
Prish et al.

(10) Patent No.: US 9,171,099 B2
(45) Date of Patent: Oct. 27, 2015

(54) SYSTEM AND METHOD FOR PROVIDING CALCULATION WEB SERVICES FOR ONLINE DOCUMENTS

(75) Inventors: Shahar Prish, Redmond, WA (US); Lawrence Waldman, Seattle, WA (US); Daniel Battagin, Bellevue, WA (US); Jon Garret Simmons, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/570,071

(22) Filed: Aug. 8, 2012

(65) Prior Publication Data

US 2013/0198323 A1 Aug. 1, 2013

Related U.S. Application Data

(60) Provisional application No. 61/591,208, filed on Jan. 26, 2012.

(51) Int. Cl.
*G06F 15/16* (2006.01)
*G06F 17/30* (2006.01)

(52) U.S. Cl.
CPC .............................. *G06F 17/30905* (2013.01)

(58) Field of Classification Search
CPC ...... B21D 43/105; B21D 43/18; G05B 19/08; G05B 19/425; G05B 2219/34388; G05B 2219/36159; G05B 2219/36495; G05B 2219/37092; G05B 2219/41309; G05B 2219/41472; G05B 2219/42186; G05B 2219/45051
USPC ..................................... 709/206; 707/10, 101
See application file for complete search history.

(56) References Cited

U.S. PATENT DOCUMENTS

| 5,212,788 A | 5/1993 | Lomet et al. |
| 5,339,392 A | 8/1994 | Risberg et al. |

(Continued)

FOREIGN PATENT DOCUMENTS

| AU | 2006291313 | 7/2011 |
| CA | 2618224 | 7/2014 |

(Continued)

OTHER PUBLICATIONS

Mcpherson; Bruce, Serializing Excel Data for Input to any Google Visualization—Published Date: Jan. 26, 2011; 6 pgs; http://www.eggheadcafe.com/tutorials/excel/571d84dc-9fcf-44de-b2ad-005c12372ab3/serializing-excel-data-for-input-to-any-google-visualization.aspx.

(Continued)

*Primary Examiner* — David Lazaro
*Assistant Examiner* — Zia Khurshid
(74) *Attorney, Agent, or Firm* — Damon Rieth; Danielle Johnston-Holmes; Micky Minhas (57) ABSTRACT

Embodiments of the present disclosure provide a method and system for providing additional functionality, including web functionality, to one or more online documents. Specifically, embodiments described herein include receiving a selection of a range of data to be used in a web extension and binding the selection of the range of data to the web extension. Once the data is bound, the binding is stored in a remote computing device. In response to the detection of the interaction with the bound range of data, the bound range of data is sent to the remote computing device where the bound range of data is updated based on the interaction. The updated data is then sent to the web extension to enable the web extension to be updated with the newly received data.

20 Claims, 8 Drawing Sheets

(56) References Cited

U.S. PATENT DOCUMENTS

| | | |
|---|---|---|
| 5,371,675 A | 12/1994 | Greif et al. |
| 5,418,902 A | 5/1995 | West et al. |
| 5,423,034 A | 6/1995 | Cohen-Levy et al. |
| 5,452,447 A | 9/1995 | Nelson et al. |
| 5,555,403 A | 9/1996 | Cambot et al. |
| 5,604,854 A | 2/1997 | Glassey |
| 5,613,058 A | 3/1997 | Koppolu et al. |
| 5,694,608 A | 12/1997 | Shostak |
| 5,708,827 A | 1/1998 | Kaneko et al. |
| 5,727,161 A | 3/1998 | Purcell, Jr. |
| 5,819,292 A | 10/1998 | Hitz et al. |
| 5,852,439 A | 12/1998 | Musgrove et al. |
| 5,883,623 A | 3/1999 | Cseri |
| 5,890,174 A | 3/1999 | Khanna et al. |
| 5,893,125 A | 4/1999 | Shostak |
| 5,899,988 A | 5/1999 | Depledge et al. |
| 5,978,818 A | 11/1999 | Lin |
| 5,987,481 A | 11/1999 | Michelman et al. |
| 6,003,012 A | 12/1999 | Nick |
| 6,009,455 A | 12/1999 | Doyle |
| 6,023,691 A | 2/2000 | Bertrand et al. |
| 6,157,934 A | 12/2000 | Khan et al. |
| 6,160,549 A | 12/2000 | Touma et al. |
| 6,199,099 B1 | 3/2001 | Gershman et al. |
| 6,216,138 B1 | 4/2001 | Wells et al. |
| 6,247,008 B1 | 6/2001 | Cambot et al. |
| 6,256,651 B1 | 7/2001 | Tuli |
| 6,269,403 B1 | 7/2001 | Anders |
| 6,298,334 B1 | 10/2001 | Burfield et al. |
| 6,360,246 B1 | 3/2002 | Begley et al. |
| 6,460,059 B1 | 10/2002 | Wisniewski |
| 6,484,186 B1 | 11/2002 | Rungta |
| 6,490,593 B2 | 12/2002 | Proctor |
| 6,501,491 B1 | 12/2002 | Brown et al. |
| 6,507,865 B1 | 1/2003 | Hanson et al. |
| 6,578,027 B2 | 6/2003 | Cambot et al. |
| 6,592,626 B1 | 7/2003 | Bauchot et al. |
| 6,613,098 B1 | 9/2003 | Sorge et al. |
| 6,625,603 B1 | 9/2003 | Garg et al. |
| 6,631,497 B1 | 10/2003 | Jamshidi et al. |
| 6,631,498 B1 | 10/2003 | McCauley et al. |
| 6,632,249 B2 | 10/2003 | Pollock |
| 6,651,075 B1 | 11/2003 | Kusters et al. |
| 6,662,341 B1 | 12/2003 | Cooper et al. |
| 6,691,100 B1 | 2/2004 | Alavi et al. |
| 6,701,485 B1 | 3/2004 | Igra et al. |
| 6,757,867 B2 | 6/2004 | Bauchot et al. |
| 6,775,675 B1 | 8/2004 | Nwabueze et al. |
| 6,801,910 B1 | 10/2004 | Bedell et al. |
| 6,832,351 B1 | 12/2004 | Batres |
| 6,892,211 B2 | 5/2005 | Hitz et al. |
| 6,906,717 B2 | 6/2005 | Couckuyt et al. |
| 6,988,241 B1 | 1/2006 | Guttman et al. |
| 6,990,632 B2 | 1/2006 | Rothchiller et al. |
| 6,993,533 B1 | 1/2006 | Barnes |
| 7,013,312 B2 | 3/2006 | Bala et al. |
| 7,015,911 B2 | 3/2006 | Shaughnessy et al. |
| 7,017,112 B2 | 3/2006 | Collie et al. |
| 7,031,979 B2 | 4/2006 | Kauffman |
| 7,231,657 B2 | 6/2007 | Honarvar et al. |
| 7,584,414 B2 | 9/2009 | Mortensen |
| 7,640,496 B1 | 12/2009 | Chaulk et al. |
| 7,650,644 B2 | 1/2010 | Cheng et al. |
| 7,657,571 B2 | 2/2010 | Battagin et al. |
| 7,660,843 B1 | 2/2010 | Atkinson et al. |
| 7,676,763 B2 | 3/2010 | Rummel |
| 7,730,425 B2 | 6/2010 | Reyes et al. |
| 7,752,536 B2 | 7/2010 | Megiddo et al. |
| 7,908,549 B2 | 3/2011 | Khen et al. |
| 8,245,156 B2 | 8/2012 | Mouilleseaux et al. |
| 8,279,174 B2 | 10/2012 | Jee et al. |
| 8,352,423 B2 * | 1/2013 | Phillips et al. ............... 707/610 |
| 8,381,133 B2 | 2/2013 | Iwema et al. |
| 8,549,432 B2 | 10/2013 | Warner |
| 8,566,953 B2 | 10/2013 | Campbell et al. |
| 8,601,389 B2 | 12/2013 | Schulz et al. |
| 2001/0055013 A1 | 12/2001 | Fuki |
| 2002/0010743 A1 | 1/2002 | Ryan et al. |
| 2002/0015059 A1 | 2/2002 | Clarke |
| 2002/0065846 A1 | 5/2002 | Ogawa et al. |
| 2002/0070953 A1 | 6/2002 | Barg et al. |
| 2002/0077803 A1 | 6/2002 | Kudoh et al. |
| 2002/0077842 A1 | 6/2002 | Charisius et al. |
| 2002/0078086 A1 | 6/2002 | Alden et al. |
| 2002/0113822 A1 | 8/2002 | Windl et al. |
| 2002/0129054 A1 | 9/2002 | Ferguson et al. |
| 2002/0158887 A1 | 10/2002 | Samra et al. |
| 2002/0184131 A1 | 12/2002 | Gatto |
| 2003/0011638 A1 | 1/2003 | Chung |
| 2003/0018644 A1 | 1/2003 | Bala et al. |
| 2003/0033329 A1 | 2/2003 | Bergman et al. |
| 2003/0044762 A1 | 3/2003 | Bergan et al. |
| 2003/0051209 A1 | 3/2003 | Androski et al. |
| 2003/0061305 A1 | 3/2003 | Copley et al. |
| 2003/0066030 A1 | 4/2003 | Curns et al. |
| 2003/0088586 A1 | 5/2003 | Fitzpatrick et al. |
| 2003/0105765 A1 | 6/2003 | Smith et al. |
| 2003/0120999 A1 | 6/2003 | Miller et al. |
| 2003/0169295 A1 | 9/2003 | Becerra |
| 2003/0212960 A1 | 11/2003 | Shaughnessy et al. |
| 2003/0226105 A1 | 12/2003 | Waldau |
| 2004/0003353 A1 | 1/2004 | Rivera et al. |
| 2004/0006539 A1 | 1/2004 | Royer et al. |
| 2004/0015783 A1 | 1/2004 | Lennon et al. |
| 2004/0064449 A1 | 4/2004 | Ripley et al. |
| 2004/0103366 A1 | 5/2004 | Peyton-Jones et al. |
| 2004/0117731 A1 | 6/2004 | Blyashov |
| 2004/0128147 A1 | 7/2004 | Vallinayagam et al. |
| 2004/0143788 A1 | 7/2004 | Aureglia et al. |
| 2004/0168115 A1 | 8/2004 | Bauernschmidt et al. |
| 2004/0174397 A1 | 9/2004 | Cereghini et al. |
| 2004/0181748 A1 | 9/2004 | Jamshidi et al. |
| 2004/0199867 A1 | 10/2004 | Brandenborg |
| 2004/0221233 A1 | 11/2004 | Thielen |
| 2004/0268364 A1 | 12/2004 | Faraj |
| 2005/0039144 A1 | 2/2005 | Wada et al. |
| 2005/0049906 A1 | 3/2005 | Leymann et al. |
| 2005/0097146 A1 | 5/2005 | Konstantinou et al. |
| 2005/0102608 A1 | 5/2005 | Batres |
| 2005/0108052 A1 | 5/2005 | Omaboe |
| 2005/0114661 A1 | 5/2005 | Cheng et al. |
| 2005/0144554 A1 | 6/2005 | Salmon et al. |
| 2005/0210389 A1 | 9/2005 | Middelfart |
| 2005/0278647 A1 | 12/2005 | Leavitt et al. |
| 2005/0289136 A1 | 12/2005 | Wu et al. |
| 2006/0013462 A1 | 1/2006 | Sadikali |
| 2007/0028159 A1 | 2/2007 | Ying et al. |
| 2007/0050416 A1 | 3/2007 | Battagin et al. |
| 2007/0061698 A1 | 3/2007 | Megiddo et al. |
| 2007/0061699 A1 | 3/2007 | Battagin et al. |
| 2007/0130517 A1 | 6/2007 | Wu |
| 2007/0136653 A1 | 6/2007 | Khen et al. |
| 2007/0176898 A1 | 8/2007 | Suh |
| 2008/0036743 A1 | 2/2008 | Westerman |
| 2008/0046462 A1 * | 2/2008 | Kaufman et al. ............. 707/102 |
| 2008/0046803 A1 | 2/2008 | Beauchamp et al. |
| 2008/0235352 A1 | 9/2008 | Yolleck et al. |
| 2008/0271127 A1 | 10/2008 | Naibo et al. |
| 2009/0083619 A1 | 3/2009 | Davis |
| 2009/0254572 A1 * | 10/2009 | Redlich et al. .................. 707/10 |
| 2009/0309849 A1 | 12/2009 | Iwema et al. |
| 2009/0327964 A1 | 12/2009 | Mouilleseaux et al. |
| 2010/0131529 A1 | 5/2010 | Kasera et al. |
| 2010/0192103 A1 | 7/2010 | Cragun et al. |
| 2011/0145299 A1 | 6/2011 | Zhou |
| 2011/0145689 A1 | 6/2011 | Campbell et al. |
| 2011/0154268 A1 | 6/2011 | Trent et al. |
| 2011/0320563 A1 | 12/2011 | Seo |
| 2012/0013540 A1 | 1/2012 | Hogan |
| 2012/0180002 A1 | 7/2012 | Campbell et al. |
| 2012/0221933 A1 | 8/2012 | Heiney et al. |
| 2012/0330995 A1 | 12/2012 | Muenkel |
| 2013/0117651 A1 | 5/2013 | Waldman et al. |
| 2013/0198323 A1 | 8/2013 | Prish et al. |

(56) References Cited

U.S. PATENT DOCUMENTS

FOREIGN PATENT DOCUMENTS

| | | |
|---|---|---|
| CA | 2 616 563 | 5/2015 |
| CN | 1578949 A | 2/2005 |
| CN | 1655120 A | 8/2005 |
| CN | 101326520 A | 12/2008 |
| CN | 101983388 A | 3/2011 |
| CN | 1877505 A | 1/2014 |
| EP | 0798655 | 1/1997 |
| EP | 1 367 514 | 12/2003 |
| EP | 1 603 053 | 7/2005 |
| EP | 1 922 939 | 5/2008 |
| JP | 8-500200 | 1/1996 |
| JP | 2001-109741 | 4/2001 |
| JP | 2001-312442 | 11/2001 |
| JP | 2003-050964 | 2/2003 |
| JP | 2003-108440 | 4/2003 |
| JP | 2003-281128 | 10/2003 |
| JP | 2003-533755 | 11/2003 |
| JP | 2004-145713 | 5/2004 |
| KR | 10-2009-0007365 | 1/2009 |
| KR | 10-2011-0139649 | 12/2011 |
| MX | 278251 | 8/2010 |
| RU | 2 390 834 | 5/2010 |
| RU | 2 419 853 | 5/2011 |
| SG | 117587 | 12/2007 |
| TW | I416342 | 11/2013 |
| WO | 00/72197 | 11/2000 |
| WO | 02/03595 | 1/2002 |
| WO | 2007/032907 | 3/2007 |
| WO | 2010/065664 A1 | 6/2010 |
| WO | 2010/071630 A1 | 6/2010 |

OTHER PUBLICATIONS

Oliver, Andrew C. And Barozzi, Nicola Ken, POI-HSSF and POI-XSSF—Java API to Access Microsoft Excel Format Files—Retrieved Date: Jan. 11, 2012; 2 pgs; http://poi.apache.org/spreadsheet/.
Battagin, Dan, Using Excel Web Services in a SharePoint Web Part—Publsihed Date: Nov. 2006-##, 8 pgs; http://msdn.microsoft.com/en-us/library/aa973804%28v=office.12%29.aspx.
Fox, Pamela, How to Convert a Google Spreadsheet into JSON, XML, and MySQL—Published Date: May 17, 2009; 7 pgs; http://blog.pamelafox.org/2009/05/how-to-convert-google-spreadsheet-into.html.
Author Unknown, About Dynamic Data Exchange—Published Date: Sep. 6, 2011, 5 pgs; http://msdn.microsoft.com/en-us/library/windows/desktop/ms648774%28v=vs.85%29.aspx Dynamic Data Exchange Protocol.
Levin, Carol, "Skinny Clients to Rule on Web—Corporate Intranets Will Fuel a New Breed of Applications," PC Magazine, Mar. 26, 1996, vol. 15, No. 6, p. 37.
Loney et al., "An Overview of Databases and Instances"; In: Oracle Database 10g DBA Handbook, Mar. 24, 2005; Oracle Press; 2 pgs. (cited in Feb. 27, 2012 EP Search Report).
Loney et al., "Dynamic Data Replication"; In: Oracle Database 10g DBA Handbook, Mar. 24, 2005; Oracle Press; 2 pgs. (cited in Feb. 27, 2012 EP Search Report).
Loney et al., "Oracle Logical Database Structures"; In: Oracle Database 10g DBA Handbook, Mar. 24, 2005; Oracle Press; 16 pgs. (cited in Feb. 27, 2012 EP Search Report).
Loney et al., "Overview of Oracle Net"; In: Oracle Database 10g DBA Handbook, Mar. 24, 2005; Oracle Press; 12 pgs. (cited in Feb. 27, 2012 EP Search Report).
McManus, Sean, "Excel Everywhere for HTML: Transform Static Excel Spreadsheets Into Smart Interactive Web Pages," Internet Magazine, Mar. 2004, No. 115, p. 106.
"Object Lens: A Spreadsheet for Cooperative Work; Abstract," by Kum-Yew Lai, et al., Sep. 1988, Retrieved from the Internet: https://hpds1.miteduibitstream/1721.1/2210/1/SWP-2053-21290214.pdf, Retrieved on Dec. 12, 2005, 42 pgs.
Powell, Jim, "Add-Ins Turn App Docs Into Web Pages: Microsoft Internet Assistant Tools," Windows Magazine, Jun. 1, 1996, vol. 7, No. 6, p. 120.
Quixa, Builder/Quixa Solutions, http://www.guixa.com/ultimus/builder.asp, 2005, 4 pgs.
Smedley, T.J., et al., "Expanding the utility of spreadsheets through the integration of visual programming and user interface objects," The ACM Digital Library, 1996, 148-155.
Stinson, C.. Microsoft Office Excel 2003, Sep. 3, 2003, Microsoft Press, pp. 1-7 (cited in Nov. 26, 2008 OA).
Truvé, S., "Dynamic what-if analysis: exploring computational dependencies with slidercells and micrographs," Mosaic of Creativity, 1995,280-281.
"Welcome to Gnumeric!" Retrieved from the Internet: http://www.gnome.org/projects/gnumeric/, Retrieved on Dec. 12, 2005, 2 pgs.
"WP01:WebSphere MQ Workflow-Performance Estimates and Capacity Assessments", http://www.1.ibm.com/suggort/docview.wss?rs= 171 &uid=swg24006573&I0c=enUS&cs=ytu-8&lang=en, 2 pgs.
"XESS The Advanced X Windows Spreadsheet System," Retrieved from the Internet: http://www.ais.com/Xess/xess5_product_sheet.html, Retrieved on Dec. 12, 2005, 3 pgs.
Zhao, J.J., "Developing Web-Enabled Interactive Financial Tools Without HTML and Script Languages," Information Technology, Learning, and Performance Journal, Fall 2001, vol. 19, No. 2, p. 49-53.
Office Action dated Jan. 8, 2008, issued in U.S. Appl. No. 11/214,676.
Office Action dated Jul. 2, 2008, issued in U.S. Appl. No. 11/214,676.
Office Action dated Nov. 19, 2008, issued in U.S. Appl. No. 11/223,541.
Office Action dated Nov. 21, 2008, issued in U.S. Appl. No. 11/214,676.
Office Action dated Nov. 26, 2008, issued in U.S. Appl. No. 11/223,180.
Office Action dated Mar. 30, 2009, issued in U.S. Appl. No. 11/298,380.
Office Action dated Apr. 23, 2009, issued in U.S. Appl. No. 11/223,180.
Office Action dated May 26, 2009, issued in U.S. Appl. No. 11/223,541.
Office Action dated Jun. 1, 2009, issued in U.S. Appl. No. 11/214,676.
Office Action dated Sep. 1, 2009, issued in U.S. Appl. No. 11/223,180.
Office Action dated Sep. 14, 2009, issued in U.S. Appl. No. 11/298,380.
Office Action dated Jan. 20, 2010, issued in U.S. Appl. No. 11/223,541.
Office Action dated Mar. 2, 2010, issued in U.S. Appl. No. 11/298,380.
Office Action dated Sep. 15, 2010, issued in U.S. Appl. No. 11/223,541.
Office Action dated Dec. 8, 2010, issued in U.S. Appl. No. 11/860,394.
Office Action dated Mar. 2, 2011, issued in U.S. Appl. No. 11/223,541.
Office Action dated Jun. 17, 2011, issued in U.S. Appl. No. 11/860,394.
Office Action dated Jun. 23, 2011, issued in U.S. Appl. No. 11/223,541.
Office Action dated Oct. 7, 2011, issued in U.S. Appl. No. 11/223,541.
Office Action dated Nov. 8, 2011, issued in U.S. Appl. No. 11/860,394.
Office Action dated Apr. 20, 2012, issued in U.S. Appl. No. 11/860,394.
Office Action dated Apr. 30, 2012, issued in U.S. Appl. No. 11/223,541.
Office Action dated Sep. 25, 2012, issued in U.S. Appl. No. 11/223,541.
Office Action dated Feb. 13, 2013, issued in U.S. Appl. No. 13/289,663.

(56) References Cited

OTHER PUBLICATIONS

Office Action dated Apr. 22, 2013, issued in U.S. Appl. No. 11/223,541.
Office Action dated Nov. 6, 2013, issued in U.S. Appl. No. 13/289,663.
PCT Application PCT/US2013/022824, International Search Report mailed May 30, 2013, 10 pages.
International Search Report dated Jan. 8, 2007, issued in PCT Application No. PCT/US2006/033800; 2 pgs.
PCT Search Report dated Jan. 9, 2007 in Appln No. PCT/US2006/034312.
Australian Examination Report dated May 29, 2007, cited in Appln No. SG 200503164-6 dated May 29, 2007.
Chinese Office Action dated May 22, 2009, cited in Appln No. 200680032787.3.
Chinese Office Action dated Jul. 24, 2009, cited in Appln No. 200680031441.1.
Australian Examination Report dated Oct. 22, 2009, cited in Appln No. 2006284595.
Chinese Second Office Action dated Nov. 13, 2009, cited in Appln No. 200680032787.3.
Russian Office Action dated Jul. 29, 2010, cited in Appln No. 2008107762.
Chinese Second Office Action dated Feb. 5, 2010, cited in Appln No. 200680031441.1.
Mexican Office Action cited in Appl No. MX/a/2008/003318, dated Aug. 17, 2010, 3 pgs.
Mexican Office Action dated Jul. 14, 2010, cited in Appl No. MX/a/2008/002501.
Russian Office Action dated Sep. 6, 2010, cited in Appln No. 2008108999.
Russian Office Action dated Sep. 22, 2010, cited in Appln No. 2008108992.
Australian Examination Report dated Oct. 26, 2010 cited in Appln No. 2006291313.
Australian Examination Report dated Oct. 29, 2010 cited in Appln No. 2006287357.
Mexican Office Action dated Dec. 8, 2010, cited in Appl No. MX/a/2008/003318.
New Zealand Examination Report dated Jan. 20, 2011 cited in Appln No. 566309.
Japanese Notice of Rejection dated Apr. 22, 2011 cited in Appln No. 2008-529328.
New Zealand Examination Report dated May 5, 2011 cited in Appln No. 566309.
New Zealand Examination Report dated Sep. 9, 2011 cited in Appln No. 594997.
Mexican Office Action dated Oct. 4, 2011 in Appln No. MX/a/2008/003309.
Japanese Notice of Rejection cited in Appln No. 2008-530095 dated Jan. 31, 2012.
Japanese Notice of Rejection dated Feb. 3, 2012 cited in Appln No. 2008-530243.
European Search Report dated Feb. 27, 2012 in Appl No. PCT/US2006/034312.
Mexican Office Action dated Apr. 27, 2012, cited in Appl No. MX/a/2008/003318.
Japanese Final Notice of Rejection dated Dec. 7, 2012 in Appln No. 2008-530095.
New Zealand Further Examination Report dated Dec. 14, 2012 cited in Appln No. 594997.
Canadian Office Action dated Dec. 17, 2012 in Appln No. 2,618,211.
Korean Preliminary Rejection dated Jan. 13, 2013 in Appln No. 10-2008-7004303.
Mexican Office Action dated Feb. 11, 2013 in Appln No. MX/a/2008/003309.
International Search Report mailed Mar. 22, 2013, issued in PCT/US2012/063133.
Mexican Office Action dated May 6, 2013, cited in Appl No. MX/a/2008/003318.
Canadian Office Action dated May 13, 2013 in Appln No. 2,618,224.
Blattner, "Special Edition Using Microsoft Excel 2003"; Que, published Sep. 11, 2003, pp. 16, 47-51, 350-369 and 445-447, 30 pgs. (cited in Sep. 2010 OA).
Brain Matter [Online], AlphaBlox, Apr. 5, 2001 [Retrieved on Sep. 7, 2006]. Retrieved from <URL:http://web.archive.org/web/20010405152714/www.blox.com/?id=sheet>.
Brain Matter [Online], AlphaBlox, Jul. 22, 2001 [Retrieved on Sep. 7, 2006]. Retrieved from <URL:http://web.archive.org/web/20010818124342/www.blox.com/products?subsection=spreadhseets>.
"Cologo: A Collaborative Web-based Programming Environment", Published on: Sep. 5, 2011, Available at: http://www.cologo-lang.org/docs_starting.html.
Curie, D., "The Medium Is the Message: Data Downlink's.xls Lets Number Stay Numbers," Online, Nov.-Dec. 1997, vol. 21, No. 6, p. 64, 66.
"Data Warehouse Trend, Part 2 OLAP is enabled on WWW Browser, formulation/operation of data warehouse becomes easy and enlargement of user target is accelerated"; Nikkei Computer, No. 440, pp. 224-227; Nikkei Business Publications, Inc., Japan, Mar. 30, 1998 (cited in Jan. 31, 2012 JP NOR).
Dodge, et al., Microsoft Office Excel 2003; Official Manual, the first edition, Nikkei BP Soft Press, Inc., Jul. 12, 2004, pp. 129-135 and 387-392 (cited in Feb. 3, 2013 JP NOR).
Dovico™ Software, "Investing in Better Time & Expense Gathering", Jun. 2005, http://www.dovico.com/documents/Investing-in-Better-Time-Expense-Gathering.pdf; 11 pgs.
Entology, "Large Diversified Manufacturer Achieves Sarbanes-Oxley Compliance through Financial Document Management", http://www.entology.com/Dress/cs/cs_029.htm, 2003, 2 pgs.
Granet, V., "The Xxl Spreadsheet Project"; Linux Journal, 1999, http://www.;inuxjournal.com/article/3186; downloaded Sep. 21, 2005; 10 pgs.
Google.com; "Getting Started with Spreadsheets Gagdets", accessed Oct. 20, 2011, at: http://code.google.com/apis/spreadsheets/gadgets/; 8 pgs.
"How to: Save a Workbook as a Web Page in Excel 2002; Summary," Retrieved from the Internet: http://support.microsoft.com/default.aspx2scid=kb;en-us;289260, Retrieved on Dec. 12, 2005, 3 pgs.
Hudson, S.E., "User interface specification using an enhanced spreadsheet model," ACM Transactions on Graphics, 1994, 13(3), 209-239.
Huynh, D.; "Timeline Gadget for Google Spreadsheets", Retrieved on: Sep. 20, 2011, Available at: http://s3.amazonaws.com/iac-production/attachments/28/TimeLine_Gadget_for_Google_Spreadsheets.pdf.
Jones, S.P., "A user-centred approach to functions in Excel," JCEP, 2003, 165-176.
Khor, "Microsoft Office Excel 2003 Preview", Jun. 2003, Microsoft Office Excel 2003 Preview, Microsoft Excel 2003 Technical Articles, Microsoft Corporation Publishing (cited in Nov. 26, 2008 OA).
Chinese Office Action pertaining to Chinese Patent Application No. 201210012142.0, dated Nov. 4, 2014, 6 pages.
Taiwan Notice of Allowance dated Jul. 30, 2013 in Appln No. 95132059, 3 pgs.
Chinese Office Action dated Jan. 6, 2014 in Appln No. 201210012142.0, 10 pgs.
India First Examination Report dated Jan. 22, 2014 cited in 1286/DEL/2005, 2 pgs.
Canadian Notice of Allowance dated Apr. 3, 2014 in Appln No. 2,618,224, 2 pgs.
Malaysian Notice of Allowance dated Jun. 13, 2014 in Appln No. PI 20080500, 2 pgs.
Malaysian Modified Substantive Examination Report dated Aug. 15, 2014 in Appln No. PI 20080396 2 pgs.
Chinese Office Action and Search Report Issued in Patent Application No. 201210434821.7, Mailed Date: Oct. 27, 2014, 13 Pages.
Person, R.; "Special Edition Using Microsoft Excel '97"; © 1997 Que Corp., pp. 385-410 (cited in Apr. 22, 2013 OA).
Office Action dated May 8, 2014, issued in U.S. Appl. No. 12/986,473, 75 pgs.

(56) References Cited

OTHER PUBLICATIONS

Office Action dated Nov. 19, 2014, issued in U.S. Appl. No. 13/035,689, 31 pgs.
Office Action dated Dec. 24, 2014, issued in U.S. Appl. No. 12/986,473, 28 pgs.
Notice of Allowance dated Feb. 6, 2015, issued in U.S. Appl. No. 13/289,663, 57 pgs.
Malaysia Modified Substantive Examination Report dated Feb. 13, 2015 in Appln No. PI 20080396, 2 pgs.
Office Action dated Mar. 26, 2015 issued in U.S. Appl. No. 13/035,689, 24 pgs.
Malaysia Substantive Examination Report dated Jan. 15, 2014 in Appln No. PI 20080503, 3 pgs.
Office Action dated Dec. 20, 2013, issued in U.S. Appl. No. 11/223,541, 54 pgs.
Office Action dated May 22, 2014, issued in U.S. Appl. No. 13/035,689, 60 pgs.
Office Action dated Jul. 7, 2014, issued in U.S. Appl. No. 11/223,541, 30 pgs.
Chinese Third Office Action and Search Report Issued in Patent Application No. 201210012142.0, Mailed Date: May 18, 2015, 13 Pages.
Chinese Second Office Action Issued in Patent Application No. 201210434821.7, Mailed Date: Jun. 19, 2015, 8 pages.
EP Extended Search Report dated Jul. 16, 2015 in Appln No. PCT/US2012/063133, 9 pgs.
Andrews et al., "Liquid Diagrams: Information Visualization Gadgets"; Information Visualization (IV), 2010 14th International Conference, IEEE, Jul. 26, 2010; pp. 104-109 (cited in Jul. 16, 2015 ISR).

* cited by examiner

SYSTEM AND METHOD FOR PROVIDING CALCULATION WEB SERVICES FOR ONLINE DOCUMENTS

PRIORITY

The present application claims priority to U.S. Provisional Patent Application No. 61/591,208 which was filed on Jan. 26, 2012. The aforementioned application is hereby incorporated by reference in its entirety.

BACKGROUND

Spreadsheets and other documents are used for various purposes, such as analyzing, managing, and sharing information. Spreadsheets and other documents may be configured to present various visualization tools to help the track and highlight important data and data trends. At times, finding proper functionality to present the data in a particular manner may be difficult. As such, many users and businesses attempt to add custom functionality to a spreadsheet application or other document application but programming these additions can be difficult.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide a method and system for providing additional functionality, including web functionality, to one or more online documents. Specifically, embodiments described herein include receiving a selection of a range of data to be used in a web extension and binding the selection of the range of data to the web extension. Once the data is bound, the binding is stored in a remote computing device. In response to the detection of the interaction with the bound range of data, the bound range of data is sent to the remote computing device where the bound range of data is updated based on the interaction. The updated data is then sent to the web extension to enable the web extension to be updated with the newly received data.

Embodiments may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following Figures in which.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
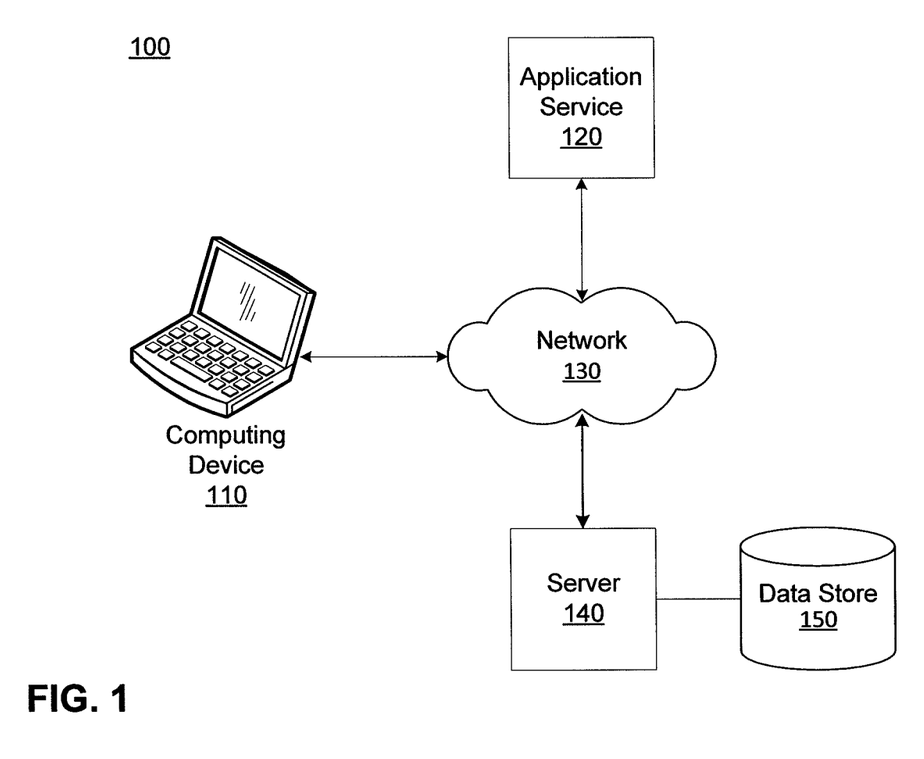
FIG. 1 illustrates a system for providing calculation web services for one or more online applications according to one or more embodiments.

FIG. 1 illustrates a system 100 for providing calculation web services for one or more online applications according to one or more embodiments. As shown in FIG. 1, the system 100 includes a computing device 110 that may access an application service 120 over a network connection 130. In certain embodiments the computing device 110 includes one or more local applications that enable a user to create content. Examples of such applications include spreadsheet applications, word processing applications, database applications and the like. Although specific local applications have been mentioned, it is also contemplated that the computing device 110 may have additional applications not specifically mentioned herein.

The computing device 110 may also have access to various online applications provided by the application service 120. The online applications may enable a user to create online documents such as online spreadsheet documents, online word processing documents and the like. Although online documents are specifically mentioned, it is contemplated that the embodiments described herein may be used for documents that are stored locally. In such embodiments, the web extension (discussed below) is also stored locally and applied to the locally stored document even if no internet connection is present (i.e., the document is "offline"). In certain embodiments, the application service 120 is a cloud based or enterprise based service that is configured to provide services relating to the one or more online applications. As briefly discussed, such a service may enable a user to create web-based versions of documents similar to documents created by the local applications.

In certain embodiments, the application service 120 is a multi-tenant service that provides resources and services to the computing device 110 as well as other computing devices (not shown). In embodiments where the application service 120 is a cloud based service, the application service 120 may require that each tenant subscribe to the application service 120.

In certain embodiments, the online or web-based applications that are accessible by the computing device 110 may enable a user to define and utilize one or more web extensions or gadgets. Generally, web extensions are configured to display information at a glance. For example, a web extension may be created to display an interactive bar chart that may obtain data from an online spreadsheet and also be used to place data within the online spreadsheet. In certain embodiments, the web extension is displayed in the online document in a specified web frame (e.g., a box that renders web content in a particular document or online document). In embodiments, each web extension or gadget provides web content to an online document created by the online application in the same manner as other content on the web. Not only can the web extension show content that is obtained from the online spreadsheet, the web extension can cause the display of the online spreadsheet to change. Although an online spreadsheet web extension is specifically mentioned, it is contemplated that the web extensions may be used by various online applications and may be configured to perform various operations.

In certain embodiments, web extensions may be built using different programming languages such as, for example, XML, HTML, JavaScript, ADOBE FLASH, and the like. Additionally, web extensions may be executed on a network site, on a local machine, or may be contained within the online spreadsheet document, a local spreadsheet document or other document associated with a particular application—either online or local.

As will be explained below, when the application that is executing the web extension is an online application, such as, for example, an online spreadsheet application, the web extensions associated with the particular online spreadsheet application may be configured communicate with the server 140. This communication may include sending and receiving data from the server 140 which causes the web extension to be rendered in various ways. For example, if new data is input into an online spreadsheet document generated by the online spreadsheet application, that new data may be transmitted to the server 140. The server may then perform one or more functions on the data and transmit the new data back to the web extension. The web extension is then updated based on the data received from the server. In certain embodiments, the new data received from the online spreadsheet document may be stored by the server 140 or an associated data store 150.

As will be discussed in detail below, data in the online spreadsheet document or other online document may be bound to a specific web extension. Thus, when data in the bound region is changed and/or interacted with, the server 140 detects the change and/or interaction, stores the changes in the data e-store 150 and sends the updated data back to the online spreadsheet document. Once the updated data is received, the web extension is also updated.

In certain embodiments, the online application, such as an online spreadsheet document, may include one or more pre-defined functions. However, a user may wish to add additional, user defined functions to one or more online applications. As such, embodiments of the present disclosure also provide a user with the ability to create and define custom functions by specifying a name of the function and the parameters associated with the function. Once the function has been defined, if the function is invoked by the online document, a server, such as server 140, may invoke the function on the data and return the result to the online document.

For example, the computing device 110 may access the application service 120 and employ common functions routinely used in many of the online documents. A user may then define one or more functions that that are not built into the particular online document. This user defined function enables the user to use the user defined function by calling a defined name of the function. As with the web extensions, the functions may be stored by the server 140 in the data store 150. When a user invokes the function, the server 140 receives the data from the online document, processes the data based on the function, and returns the result to the online document.

Figure 2:
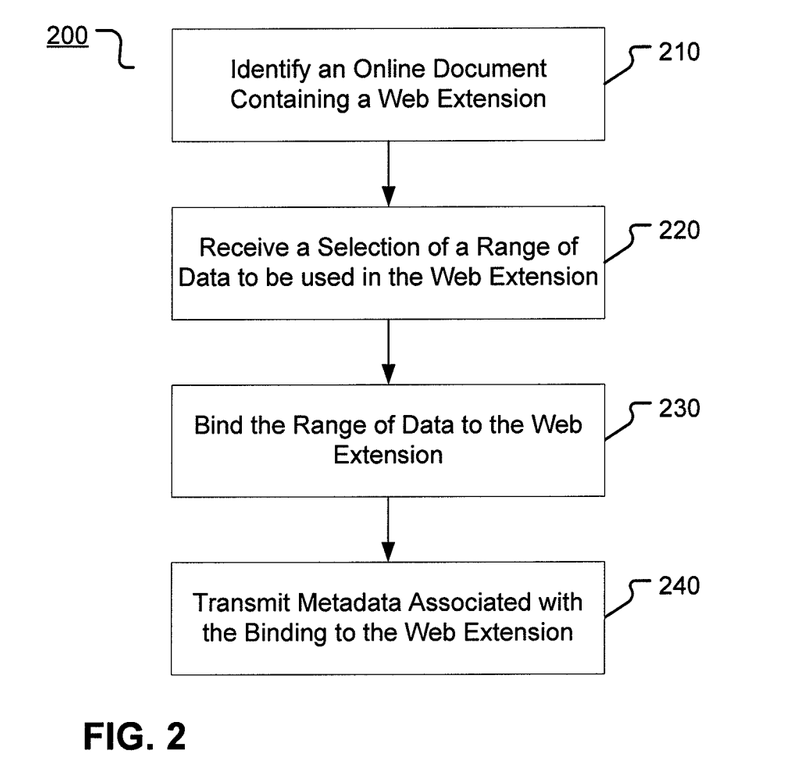
FIG. 2 illustrates a method for creating a web extension for an online document according to one or more embodiments.

FIG. 2 illustrates a method 200 for creating and updating a web extension for an online document according to one or more embodiments. Method 200 begins in operation 210 in which a web extension on online document is created/identified. In certain embodiments, the web extension may be identified based on the online document containing one or more web frames.

In an embodiment, the online document may be rendered in a browser of a computing device, such as, computing device 110. As discussed above, the online document may be an online spreadsheet document or other such online document that enables a user to add, edit, or display content. Although an online document is specifically mentioned, it is contemplated that one or more operations described below may be implemented by a computing device when a local application creates a local document.

Once the web extension has been created/identified, flow proceeds to operation 220 in which a selection of a range of data in the online document is received. In certain embodiments, the selected range of data is a range of data that is to be used by the web extension. Additionally, the range of data is the specific data that affects the rendering of the web extension. For example, if the web extension is an online map, and the online document is a spreadsheet document, the selected range of data may include a range of cells in the spreadsheet, each of which have specific coordinates on the map that are associated with locations of interest that are going to be highlighted or marked on the online map.

In certain embodiments, the selection of the data may be a user selection of one or more cells within an online spreadsheet or other online document. For example, a user may select one or more cells of the online spreadsheet using (a) touch input on a computing device, a user interface associated with the online spreadsheet, a name of an object, a range of cells and the like.

Flow then proceeds to operation 230 in which the range of data is bound to the web extension. In certain embodiments, binding of the range of data to the web extension may include specifying a unique name for the web extension, specifying a unique name for the binding, and specifying the range of cells of the online document that is associated with the web extension. Once the binding has occurred, the binding information is stored. In certain embodiments, the binding information is stored in a storage device that is accessible by a server, such as, for example, server 140 (FIG. 1).

Flow proceeds to operation 240 in which metadata associated with the binding is sent by a server to the web extension. Thereafter, when the metadata is accessed, all information relating to the metadata is passed from a calculation engine stored on a server to a rendering engine which renders the updated web extension in the online document. For example, once the data is bound to the web extension, a user may access the online document and interact with the data. In embodiments where the online document is an online spreadsheet, the user may manipulate data in one or more of the bound cells. As the user interacts with the data, the web extension registers an event and the newly changed data is sent by the online application to a server, such as, for example, server 140. A calculation engine on the server processes the changes, saves the changes, and sends the updated data to the rendering engine to be rendered in the online document. Additionally, a notification, such as an event notification is sent to the web extension notifying the web extension that the data has changed. Once notified, the web extension may request the changed data. In embodiments, the server may be configured to track all bound data associated with an online document. As a result, when the data is changed, the server automatically initiates the sending of the online document data and web extension event metadata (e.g., data that indicates that the binding has changed) to the associated web extension. In certain embodiments, the server may also store one or more settings (e.g., user preferred display settings etc.) for each web extension, and reload the settings as required.

Figure 3:
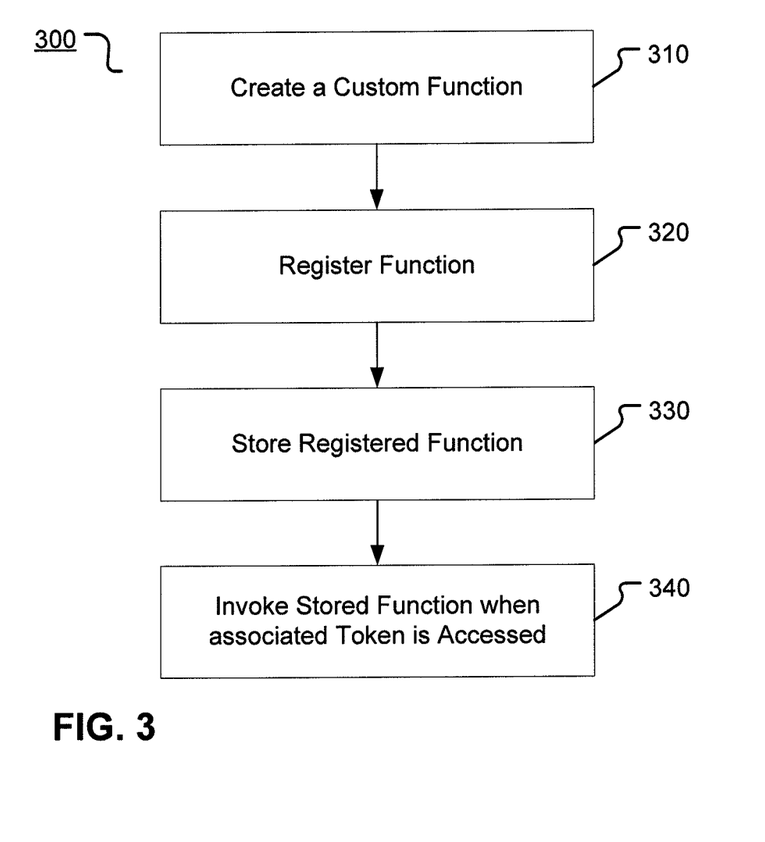
FIG. 3 illustrates a method for creating and invoking a custom function according to one or more embodiments.

FIG. 3 illustrates a method 300 for creating and invoking a custom function according to one or more embodiments. Method 300 begins at operation 310 in which a custom function is created. As discussed above, the custom function may be a function that is performed on data in an online document, such as, for example, an online spreadsheet document.

Once the custom function is created, flow proceeds to operation 320 in which the function is registered. In certain embodiments, registering the function includes binding the function to an identifier, such as, for example a token. The token may then be embedded in a browser that displays the online document or in the online document itself. When the token is accessed, the particular online function associated with the token is invoked on the data stored in the online document.

Flow then proceeds to operation 330 in which the token is stored on a server or in a data store associated with the server. In certain embodiments, the server may be server 140 (FIG. 1) and the data store may be data store 150.

Once the token has been stored, flow proceeds to operation 340 in which the stored function is invoked when the token is accessed. In certain embodiments, the calculation of data using the stored function may be performed synchronously or asynchronously. For example, if one or more calculations are being performed on the data in the online spreadsheet document, and the token is accessed, the state of the online document is maintained, the data is sent to the server which performs the calculation using the custom function, and returns the result to the online document. In another embodiment, the state of the online document is not maintained when the token is accessed. In such cases, the server may receive the token, identify the custom function that needs to be invoked and transmit the newly calculated data to the online application.

Figure 4:
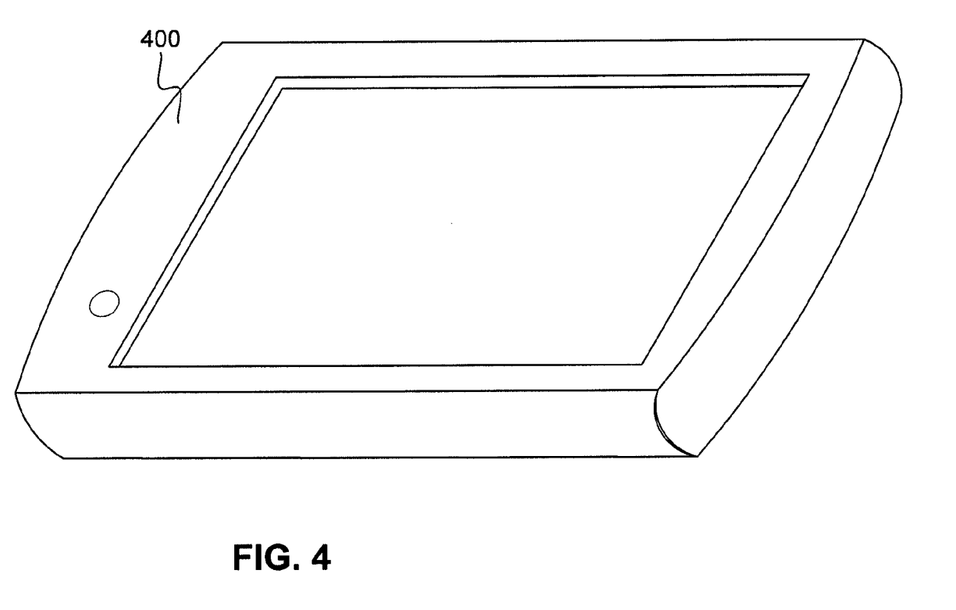
FIG. 4 illustrates a tablet computing device executing one embodiment of the present disclosure according to one or more embodiments disclosed herein.

The embodiments and functionalities described herein may operate via a multitude of computing systems including, without limitation, wired and wireless computing systems, mobile computing systems (e.g., mobile telephones, netbooks, tablet or slate type computers, and laptop computers). FIG. 4 illustrates an exemplary tablet computing device 400 that may be used to access an application service 120 or which may be used to access one or more online documents. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 6 through 8 and the associated descriptions provide a discussion of a variety of operating environments in which embodiments of the present disclosure may be practiced. However, the devices and systems illustrated and discussed with respect to FIGS. 6 through 8 are for purposes of example and illustration and are not limiting of a vast number of computing device configurations that may be utilized for practicing embodiments of the present disclosure, described herein.

Figure 5:
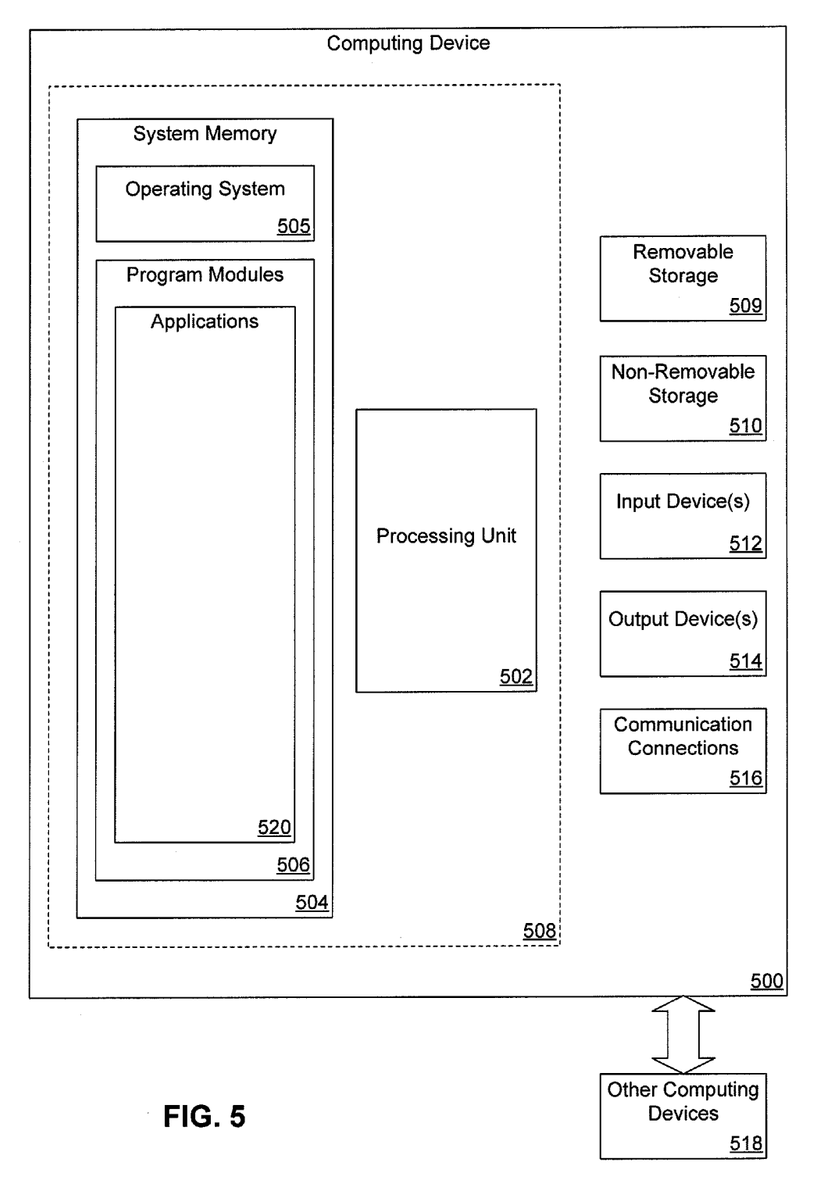
FIG. 5 illustrates a block diagram of a computing environment suitable for implementing one or more embodiments disclosed herein.

FIG. 5 is a block diagram illustrating exemplary physical components of a computing device 500 with which embodiments of the present disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination. The system memory 504 may include an operating system 505, one or more program modules 506, which are suitable for running applications 520. The operating system 505, for example, may be suitable for controlling the operation of the computing device 500. Furthermore, embodiments of the present disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, for example, one or more of the stages of the methods described herein. The aforementioned process is an example, and the processing unit 502 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the present disclosure, program modules may include routines, programs, components, data structures, and other types of structures that may perform particular tasks or that may implement particular abstract data types. Moreover, embodiments of the present disclosure may be practiced with other computer system configurations, including hand-held devices, multiprocessor systems, microprocessor-based or programmable consumer electronics, minicomputers, mainframe computers, and the like. Embodiments of the present disclosure may also be practiced in distributed computing environments where tasks are performed by remote processing devices that are linked through a communications network. In a distributed computing environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 500 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

Embodiments of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 504, the removable storage device 509, and the non-removable storage device 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 500. Any such computer storage media may be part of the computing device 500. The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, or serial ports, and other connections appropriate for use with the applicable computer readable media.

Figure 6A:
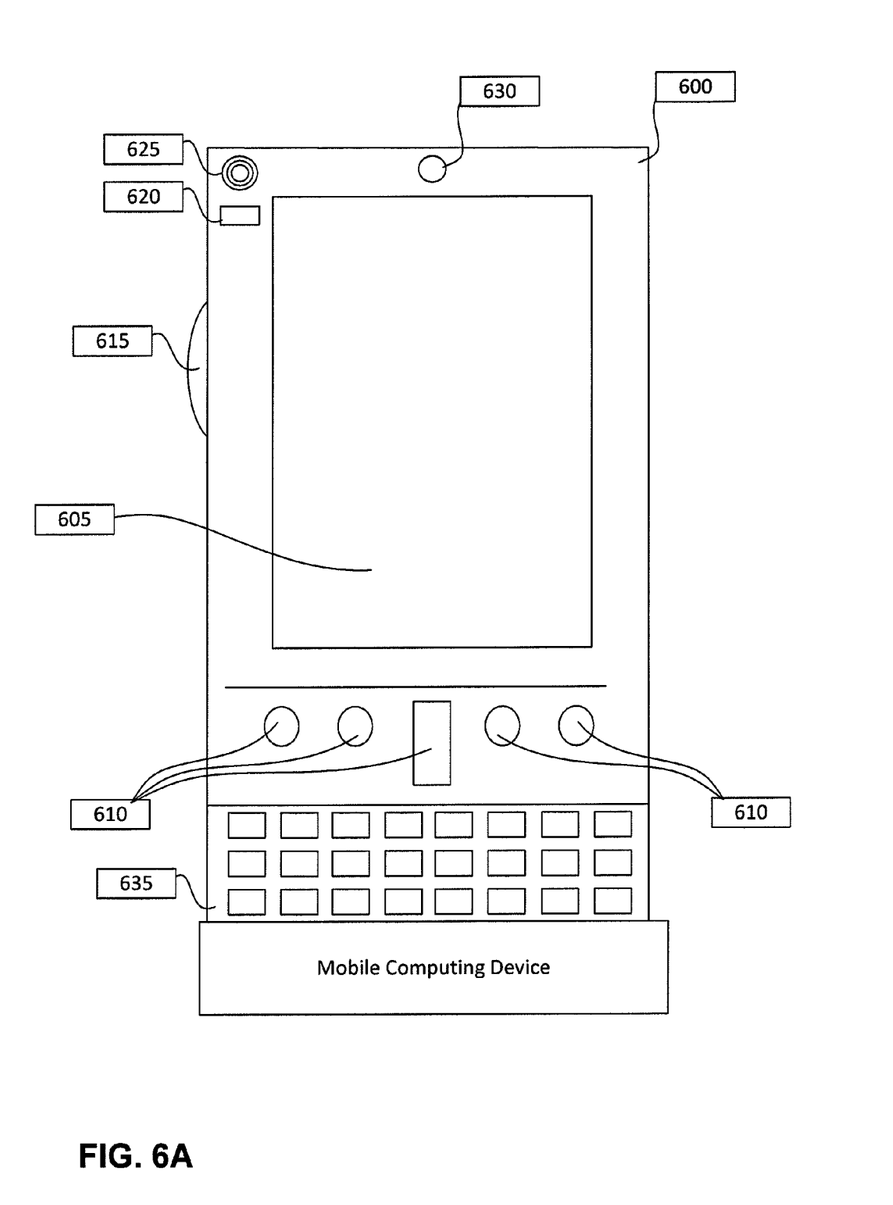
FIG. 6A illustrates one embodiment of a mobile computing device executing one or more embodiments disclosed herein.
Figure 6B:
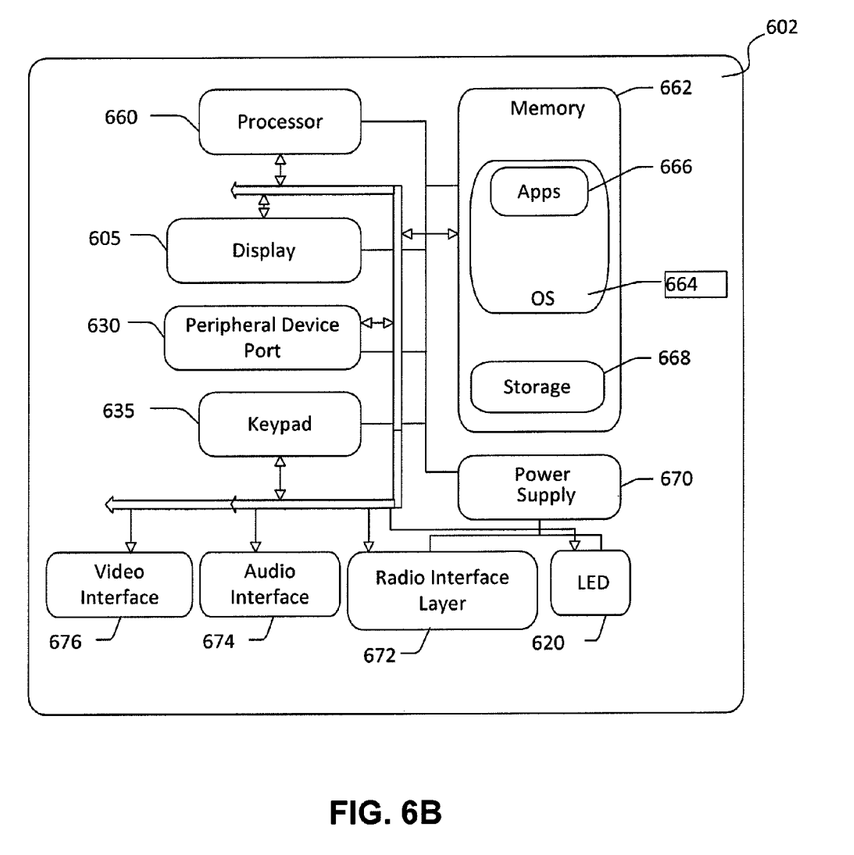
FIG. 6B is a simplified block diagram of an exemplary mobile computing device suitable for practicing one or more embodiments disclosed herein.

FIGS. 6A and 6B illustrate a mobile computing device 600, for example, a mobile telephone, a smart phone, a tablet personal computer, a laptop computer, and the like, with which embodiments of the present disclosure may be practiced. With reference to FIG. 6A, an exemplary mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

Although described herein in combination with the mobile computing device 600, in alternative embodiments, features of the present disclosure may be used in combination with any number of computer systems, such as desktop environments, laptop or notebook computer systems, multiprocessor systems, micro-processor based or programmable consumer electronics, network PCs, mini computers, main frame computers and the like. Embodiments of the present disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present disclosure.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world", via a communications carrier or service provider. Transmissions to and from the radio 672 are conducted under control of the operating system 664. In other words, communications received by the radio 672 may be disseminated to the application programs 666 via the operating system 664, and vice versa.

The radio 672 allows the system 602 to communicate with other computing devices, such as over a network. The radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 602 provides notifications using the visual indicator 620 that can be used to provide visual notifications and/or an audio interface 674 producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668. Computer storage media may include volatile and nonvolatile, removable and non-removable media implemented in any method or technology for storage of information, such as computer readable instructions, data structures, program modules, or other data.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
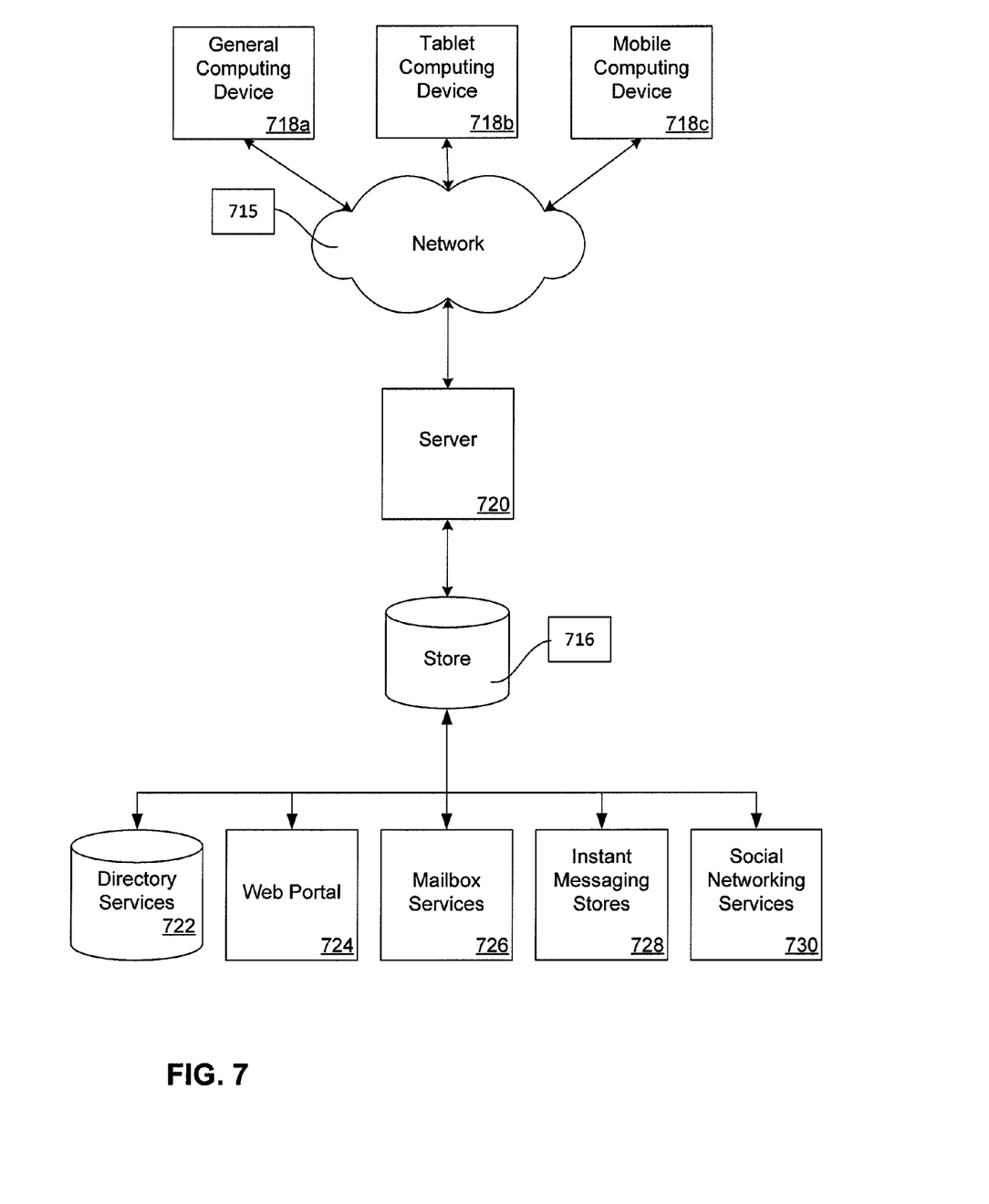
FIG. 7 is a simplified block diagram of an exemplary distributed computing system suitable for practicing one or more embodiments disclosed herein.

FIG. 7 illustrates one embodiment of the architecture of a system for providing converted documents to one or more client devices, as described above. In certain embodiments, the converted documents may be stored in different communication channels or other storage types. For example, various documents, including the converted documents, may be stored using a directory service 722, a web portal 724, a mailbox service 726, an instant messaging store 728, or a social networking site 730. The various components of the system 100 use any of these types of systems or the like for enabling data utilization, as described herein. A server 720 may provide the converted paragraphs to clients. The server 720 may provide the converted paragraphs and the status updates over the web to clients through a network 715. By way of example, the client computing device 718 may be implemented as the computing device 700 and embodied in a personal computer 718a, a tablet computing device 718b and/or a mobile computing device 718c (e.g., a smart phone). Any of these embodiments of the client computing device 718 may obtain content from the store 716. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for updating a web extension of an online document, the method comprising:
receiving a selection of a range of data within the online document to be used in the web extension;
binding the selected range of data to the web extension;
storing the binding in a remote computing device; and
in response to a detected interaction with the selected range of data:
sending the selected range of data to the remote computing device; and
sending an updated range of data to the online document such that the web extension is updated to display information corresponding to the updated range of data, wherein the updated range of data is updated based on the detected interaction.

2. The method of claim 1, wherein the online document is an online spreadsheet document.

3. The method of claim 1, wherein the range of data is sent to the remote computing device in response to a request received from the remote computing device.

4. The method of claim 1, further comprising sending one or more settings associated with the web extension to the computing device.

5. The method of claim 1, wherein the remote computing device is a server.

6. The method of claim 1, further comprising pausing additional calculations when the range of data is sent to the remote computing device.

7. The method of claim 1, wherein updating the web extension comprises updating the web extension with one or more settings associated with the web extension.

8. A method for creating a user specified function for an online document, the method comprising:
enabling creation of a user specified function on data in the online document;
registering the user specified function, wherein registering the user specified function comprises binding the function to an identifier;
storing the identifier in a remote computing device; and
in response to the identifier being accessed:
sending data in the online document to the remote computing device;
receiving updated data from the remote computing device, wherein the updated data is based, at least in part, on the user specified function; and
updating the online document based on the updated data.

9. The method of claim 8, wherein the remote computing device is a server.

10. The method of claim 8, wherein the online document is an online spreadsheet document.

11. The method of claim 8, further comprising pausing additional calculations when the data in the online document is sent to the remote computing device.

12. The method of claim 8, wherein updating the online document comprises updating the online document with one or more settings associated with the user specified function.

13. The method of claim 8, wherein binding the function to an identifier includes associating a token with the function and embedding the token in one of: (i) a browser that displays the online document, or (ii) the online document.

14. A computer storage device encoding computer executable instructions which, when executed by one or more processors, perform a method for updating a web extension of an online document, the method comprising:
receiving a selection of a range of data within the online document to be used in the web extension;
binding the selected range of data to the web extension;
storing the binding in a remote computing device; and
in response to a detected interaction with the selected range of data:
sending the selected range of data to the remote computing device; and
sending an updated range of data to the online document such that the web extension is updated to display information corresponding to the updated range of data, wherein the updated range of data is updated based on the detected interaction.

15. The computer storage device of claim 14, wherein the online document is an online spreadsheet document.

16. The computer storage device of claim 14, wherein the range of data is sent to the remote computing device in response to a request received from the remote computing device.

17. The computer storage device of claim 14, further comprising sending one or more settings associated with the web extension to the computing device.

18. The computer storage device of claim 14, wherein the remote computing device is a server.

19. The computer storage device of claim 14, further comprising pausing additional calculations when the range of data is sent to the remote computing device.

20. The computer storage device of claim 14, wherein updating the web extension comprises updating the web extension with one or more settings associated with the web extension.

* * * * *